United States Patent
Li et al.

(10) Patent No.: US 12,533,676 B2
(45) Date of Patent: Jan. 27, 2026

(54) MICROFLUIDIC CHIP ASSEMBLY FOR RAPIDLY PERFORMING DIGITAL POLYMERASE CHAIN REACTION (PCR), AND USE THEREOF

(71) Applicant: Suzhou Precigenome Ltd, Co., Suzhou (CN)

(72) Inventors: Chen Li, Suzhou (CN); Yunfeng Ling, Suzhou (CN); Yu Liu, Suzhou (CN); Hua Zhang, Suzhou (CN); Yaqi Wang, Suzhou (CN)

(73) Assignee: Suzhou Precigenome Ltd, Co., Suzhou (CN)

( * ) Notice: Subject to any disclaimer, the term of this patent is extended or adjusted under 35 U.S.C. 154(b) by 1031 days.

(21) Appl. No.: 17/620,725

(22) PCT Filed: May 21, 2020

(86) PCT No.: PCT/CN2020/091511
§ 371 (c)(1),
(2) Date: Dec. 19, 2021

(87) PCT Pub. No.: WO2020/253461
PCT Pub. Date: Dec. 24, 2020

(65) Prior Publication Data
US 2022/0205018 A1    Jun. 30, 2022

(30) Foreign Application Priority Data
Jun. 18, 2019    (CN) .......................... 201910525668.0

(51) Int. Cl.
*B01L 7/00*    (2006.01)
*B01L 3/00*    (2006.01)
(Continued)

(52) U.S. Cl.
CPC ........... *B01L 7/52* (2013.01); *B01L 3/502784* (2013.01); *B01L 9/527* (2013.01); *C12Q 1/686* (2013.01);
(Continued)

(58) Field of Classification Search
CPC ...... B01L 7/52; B01L 3/502784; B01L 9/527; B01L 7/00; B01L 2200/027;
(Continued)

(56) References Cited

U.S. PATENT DOCUMENTS 8,105,783 B2 *  1/2012  Handique ................ C12Q 1/68
                                                    435/6.12
9,850,530 B2 * 12/2017  Park ........................ C12Q 1/68
(Continued)

FOREIGN PATENT DOCUMENTS

CN    101145060 A    3/2008
CN    104893972 A    9/2015
(Continued)

OTHER PUBLICATIONS

Piggott A. How thermoelectric cooling works [2024] [Internet]. 2024 [accessed Dec. 2, 2024]. Available from: https://thermoelectricsolutions.com/how-thermoelectric-cooling-works/ (Year: 2024).*

*Primary Examiner* — Anne M. Gussow
*Assistant Examiner* — Emma R Hoppe
(74) *Attorney, Agent, or Firm* — Mei & Mark LLP; Manni Li; Guang-Yu Zhu

(57) ABSTRACT

A microfluidic chip assembly for rapidly performing digital polymerase chain reaction (PCR) and use thereof are provided. The microfluidic chip assembly includes at least one microfluidic chip, a heat sink arranged below the microfluidic chip, a heater arranged above the microfluidic chip, a semiconductor cooler arranged between the heat sink and
(Continued)

the microfluidic chip, and a heat-conducting plate arranged above the semiconductor cooler. A thin film layer is bonded at the bottom of the microfluidic chip, and the thin film layer abuts against the heat-conducting plate.

7 Claims, 4 Drawing Sheets

(51) Int. Cl.
  *B01L 7/04* (2010.01)
  *B01L 9/00* (2006.01)
  *C12Q 1/686* (2018.01)

(52) U.S. Cl.
  CPC ......... *B01L 7/04* (2013.01); *B01L 2200/0689* (2013.01); *B01L 2200/10* (2013.01); *B01L 2300/0819* (2013.01); *B01L 2400/0487* (2013.01)

(58) Field of Classification Search
  CPC ......... B01L 2200/10; B01L 2300/0867; B01L 2300/087; B01L 2300/1822; B01L 3/5025; B01L 3/5027; B01L 3/502753; B01L 2300/0809; B01L 2300/0864; C12Q 1/686; C12Q 1/70; C12Q 2527/125; C12Q 2535/101; C12Q 2565/518; C12Q 1/6834; C12Q 2521/537; C12Q 2527/153; G01N 27/44791; G01N 2035/00247; G01N 21/64; G01N 27/44721; G01N 27/745; F28D 2020/0078; F28D 20/0056
  See application file for complete search history.

(56) References Cited

U.S. PATENT DOCUMENTS

| | | | |
|---|---|---|---|
| 2016/0129445 A1 | 5/2016 | Corey et al. | |
| 2017/0239663 A1 | 8/2017 | Ceremony et al. | |
| 2019/0185909 A1* | 6/2019 | Li et al. | ............ C12Q 1/6806 |

FOREIGN PATENT DOCUMENTS

| | | | | |
|---|---|---|---|---|
| CN | 109289949 A | | 2/2019 | |
| CN | 109825426 A | | 5/2019 | |
| CN | 110205242 A | | 9/2019 | |
| EP | 2364777 B1 | * | 2/2007 | ............... B01L 7/00 |
| WO | WO-98/43740 | * | 10/1998 | ............... B01L 7/00 |
| WO | 2015200717 A2 | | 12/2015 | |
| WO | 2015200717 A3 | | 4/2016 | |
| WO | WO-2017/035484 A1 | * | 3/2017 | ............. C12M 1/34 |
| WO | WO-2017/152840 A1 | * | 9/2017 | ............. C12Q 1/68 |

* cited by examiner

MICROFLUIDIC CHIP ASSEMBLY FOR RAPIDLY PERFORMING DIGITAL POLYMERASE CHAIN REACTION (PCR), AND USE THEREOF

CROSS REFERENCE TO THE RELATED APPLICATIONS

This application is the national phase entry of International Application No. PCT/CN2020/091511, filed on May 21, 2020, which is based upon and claims priority to Chinese Patent Application No. 201910525668.0, filed on Jun. 18, 2019, the entire contents of which are incorporated herein by reference.

TECHNICAL FIELD

The present invention belongs to the technical field of high-throughput analysis systems, and relates to rapid implementation of PCR, and more particularly, to a microfluidic chip assembly for digital polymerase chain reaction (PCR), and an integrated device with the assembly.

BACKGROUND

Microfluidics is a technology for precise control and manipulation of microscale fluids, which has the characteristics of small capacity (nanoliter, picoliter, and femtoliter scale) and low energy consumption. With the microfluidics, basic operation units such as sample preparation, reaction, separation, and detection in biological, chemical, and medical analysis processes are integrated on a microfluidic chip with microfluidic channels as basic structures to realize rapid sample treatment and detection, which has advantages such as low reagent and sample consumption. With great potential in the fields of biology, chemistry, medicine, and the like, microfluidics has been developed into a new research field that involves disciplines such as biology, chemistry, medicine, fluids, electronics, materials, and machinery.

Digital PCR, which achieves nucleic acid quantification by counting based on single-molecule PCR, is an absolute quantification method. Its principle is as follows: A large amount of diluted nucleic acid solution is dispersed into microreactors or microdroplets on a chip through the microfluidic or microdroplet method, where there is one or zero nucleic acid template for each reactor. After PCR cycles, a reactor or microdroplet with a nucleic acid molecular template will give a fluorescent signal, and a reactor or microdroplet without a template does not give any fluorescent signal. According to a relative proportion of numbers of reactors with fluorescence and without fluorescence and a volume of a reactor, a nucleic acid concentration of the original solution is calculated.

The prior digital PCR is generally conducted by using a digital PCR system of Bio-Rad. In the system, a generated droplet is manually transferred to a PCR test tube using a pipettor, then the test tube is placed in a PCR thermal cycler for PCR, and after the reaction is completed, the PCR tube is taken out and placed in a droplet fluorescence detector for droplet fluorescence detection. The principle of the detection is as follows: Droplets and oil are driven into a capillary tube, and the droplets pass through a detection position one by one. The fluorescence of a droplet is read by an instrument. However, the system has the following disadvantages: 1) After droplets are generated by the system, the droplets need to be manually transferred to a 96-well plate for subsequent PCR, which will cause the loss or breakage of the droplets. 2) Due to the limitation of heat-transfer rate (since a sample is present in a test tube with a large diameter, the heating starts from the outside of the test tube), PCR proceeds slowly in the test tube, and thus the entire PCR process takes a long time, generally 150 min.

PCR is composed of three basic reaction steps: denaturation, annealing, and extension, where the three basic reactions are cycled. Since the three reactions are conducted at different temperatures, the accurate control of temperatures of the three reactions and the speed of achieving the three temperatures are very important for the quality and speed of PCR. Therefore, the development of PCR instruments is closely related to how to control the temperature cycling. In an early PCR amplifier, different constant-temperature water baths or metal temperatures are set and a DNA sample to be amplified is moved by a robotic arm to achieve the change of a sample temperature. However, this instrument is large in size and requires an operation close to manual operation. If a variable-temperature water bath or a variable-temperature metal is used to change the temperature, the robotic arm to move a sample can be omitted, but the speed of temperature change in such an instrument is still very slow. With the rapid development of the semiconductor industry, advanced PCR instruments currently on the market all use a semiconductor heating and cooling device to change the temperature, such as QuantStudio of Thermo Fisher and CFX qPCR series of BIO-RAD. However, the existing instruments are all designed for high throughput, and the highest temperature rise rate can reach about 4 C/s. Because the high-throughput design is provided to treat many samples at the same time, samples are usually placed in a 96 or 384-well plate. Thus, a temperature control area is large, and a sample object that needs to be heated or cooled has a very high thermal capacity (the 96 or 384-well plate holding the samples needs to be heated or cooled simultaneously). Therefore, it is difficult to achieve rapid heating or cooling. At present, there is no PCR instrument specifically designed for a microfluidic chip on the market.

SUMMARY

In order to overcome the deficiencies in the prior art, the present invention provides a microfluidic chip assembly for rapidly performing digital PCR, and an integrated device provided with the assembly.

The objective of the present invention is achieved by the following technical solutions:

A microfluidic chip assembly for rapidly performing digital PCR is provided, including at least one microfluidic chip, a heat sink arranged below the microfluidic chip, a semiconductor cooler arranged between the heat sink and the microfluidic chip, and a heat-conducting plate arranged above the semiconductor cooler, where a thin film layer is bonded at a bottom of the microfluidic chip and the thin film layer abuts against the heat-conducting plate.

Preferably, a heat insulation layer may be wrapped outside each of the heat-conducting plate and the semiconductor cooler.

Preferably, the microfluidic chip may include a chip body. An oil well, a sample well and a waste liquid well may be protrudingly provided on the chip body. The chip body may be provided with a sealing cover. Through holes matched with the oil well, the sample well and the waste liquid well may be formed on the sealing cover, and a sealing filter may be provided inside the through holes.

Preferably, a heater may be provided above the microfluidic chip, and the heater may be a heating resistor, a ceramic heater, and the like. Material of the heat-conducting plate can be aluminum alloy, copper, and the like.

Preferably, a pneumatic press plate may be provided above the heater.

Preferably, the pneumatic press plate may provide an air pressure to act on a reaction chamber of the microfluidic chip.

Preferably, a thin film layer may be bonded at the bottom of the microfluidic chip.

Preferably, the thin film layer at the bottom of the microfluidic chip may have a thickness of 10 μm to 500 μm, and the microfluidic chip and the thin film layer may have a total thickness of 1 mm to 5 mm, excluding the protruded wells on the microfluidic chip.

Preferably, there may be two or more microfluidic chips arranged in parallel, and the microfluidic chips may be provided on a chip tray.

Preferably, the heat-conducting plate may be circumferentially provided with a flexible heat insulation pad that plays a role of heating and temperature control.

Preferably, an integrated device with the microfluidic chip assembly for rapidly performing digital PCR is provided, including a rack. A sliding rail is provided on the rack, and the microfluidic chip assembly is provided on the sliding rail. A driving motor is provided on the rack and configured to drive the microfluidic chip assembly to move on the sliding rail. A driving mechanism is arranged above the microfluidic chip assembly and configured to drive the pneumatic press plate to move. A temperature control system and a pneumatic control system are provided on a side of the microfluidic chip assembly and are electrically connected to the microfluidic chip assembly.

Preferably, the rack may be further provided with an industrial personal computer (IPC) electrically connected to the temperature control system and the pneumatic control system.

A reaction method of an integrated device with a microfluidic chip assembly for rapidly performing digital PCR is provided, including the following steps:
S1: driving the microfluidic chip assembly by a driving motor to move out of the integrated device until a chip tray is exposed outside the integrated device;
S2: loading an oil phase reagent and a water phase reagent respectively in an oil well and a sample well of a microfluidic chip using a pipettor;
S3: sealing the reagents in the microfluidic chip in S2 through a sealing cover;
S4: driving the microfluidic chip assembly by the driving motor to move into the integrated device until the microfluidic chip assembly is exactly below a pneumatic press plate;
S5: driving the pneumatic press plate and a heater by a driving mechanism to move in a direction of the microfluidic chip until the heater is tightly attached to the upper surface of the microfluidic chip and the bottom of the microfluidic chip abuts against a heat-conducting plate;
S6: controlling a temperature control system and a pneumatic control system by an IPC to respectively control an air pressure and a temperature of the microfluidic chip assembly to complete a thermal cycling process of PCR; and
S7: driving, by the driving motor, the microfluidic chip assembly that completes a PCR process in S6 to move out of the integrated device, and taking out the microfluidic chip to complete the entire process.

Beneficial effects of the present invention: The droplet generation and the PCR are conducted on the same microfluidic chip, which avoids the transfer of generated droplets in the prior art. A thin film layer is bonded to reduce the thermal capacity of a heating object, thereby realizing rapid temperature rise and fall.

DETAILED DESCRIPTION OF THE EMBODIMENTS

Figure 1:
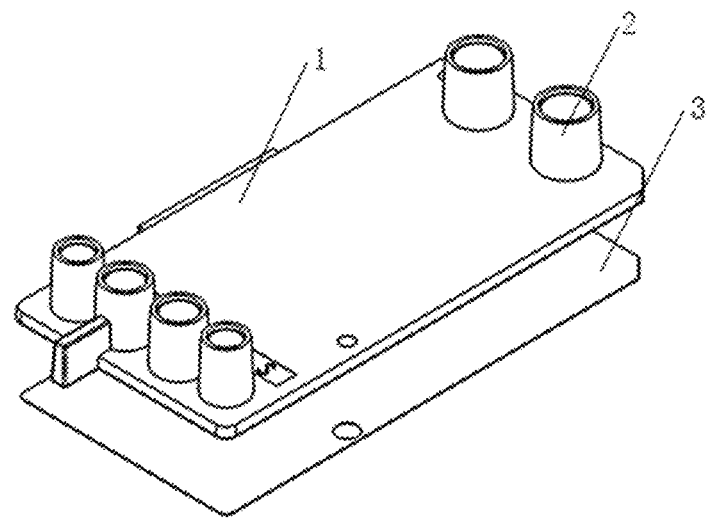
FIG. 1 is a schematic diagram illustrating a structural relationship between the microfluidic chip and the thin film layer according to the present invention.
Figure 2:
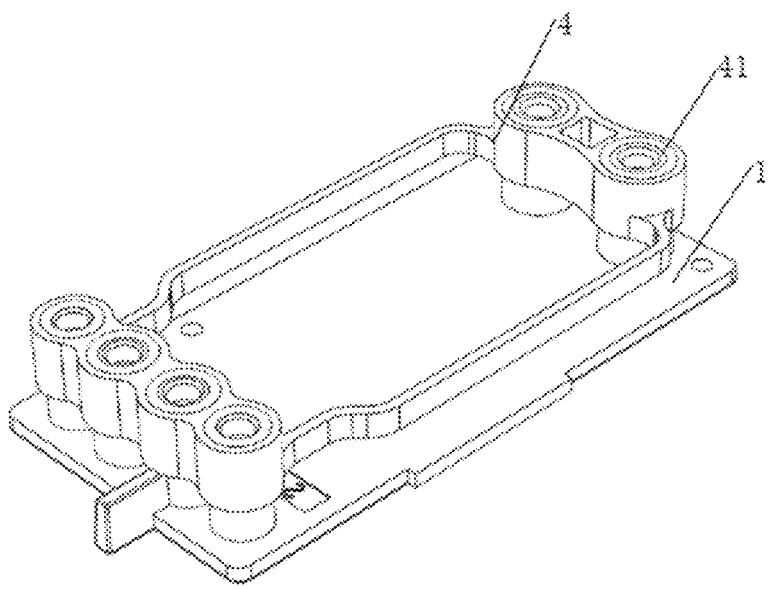
FIG. 2 is a schematic diagram illustrating a structure of the microfluidic chip with a sealing cover according to the present invention.
Figure 3:
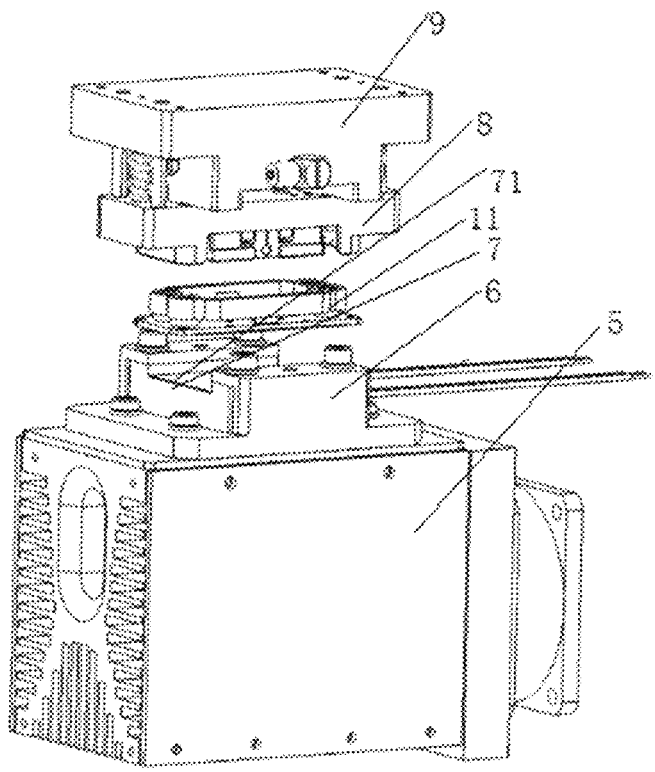
FIG. 3 is a schematic diagram illustrating a structure of the microfluidic chip assembly according to the present invention.
Figure 4:
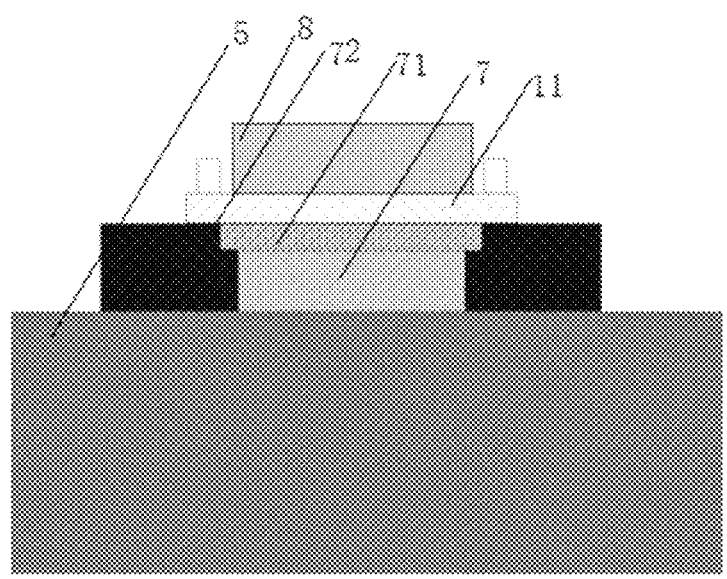
FIG. 4 is a schematic diagram of the microfluidic chip assembly according to the present invention.

The present invention discloses a microfluidic chip assembly for rapidly performing digital PCR, and a device provided with the microfluidic chip assembly, which will be described in detail below with reference to FIG. 1 to FIG. 6.

The device including a microfluidic chip assembly for rapidly performing digital PCR includes a rack 56, and the rack 56 is provided with a sliding rail 55. A guide post 51 is provided at an outer side of the sliding rail, a driving plate 91 is perpendicularly installed on the guide post 51, and a driving mechanism 92 is provided in the driving plate 91. The driving mechanism 92 can be a driving motor, which is not limited here.

The microfluidic chip assembly is provided on the sliding rail 55, and a driving motor (not shown in the figures) is provided on the rack 56 and configured to drive the microfluidic chip assembly to move on the sliding rail 55. The microfluidic chip assembly is arranged below the driving plate 91. In order to well realize automatic control, a temperature control system 52 and a pneumatic control system 53 are provided on a side of the microfluidic chip assembly and are electrically connected to the microfluidic chip assembly. The rack 56 may be further provided with an IPC 54 electrically connected to the temperature control system 52 and the pneumatic control system 53.

The microfluidic chip assembly includes at least one microfluidic chip 11, a heat sink 5 arranged below the microfluidic chip 11, and a heater 8 arranged above the microfluidic chip 11, where a pneumatic press plate 9 is arranged above the heater 8, and outlets connected to an oil well, a sample well and a waste liquid well on the microfluidic chip are formed on the pneumatic press plate 9. The pneumatic press plate 9 is connected to the driving mechanism 92, and the driving mechanism 92 can work to drive the pneumatic press plate 9 and the heater 8 to move in a direction of the guide post.

The heater is provided with a metal block, which can well transmit heat to the microfluidic chip 11, and thus an area of the metal block is set according to a heating area required by the microfluidic chip. In order to ensure the heating effect, the area of the metal block is 5% to 100% larger than the heating area required by the microfluidic chip.

The microfluidic chip 11 includes a chip body 1, protruded wells 2 are provided on the chip body 1, including an oil well, a sample well and a waste liquid well. The chip body is provided with a sealing cover 4, through holes 41 matched with the oil well, the sample well and the waste liquid well are formed on the sealing cover 4, and a sealing filter is provided inside the through holes 41, which can protect generated microdroplets from being contaminated externally and can also effectively increase the airtightness of the pneumatic structure. Since the microfluidic chip only needs to handle a small amount of sample, a thin film layer 3 is bonded with a bottom of the chip body 1 to form a seal with the chip body 1 for flow channels in the microfluidic chip. The microfluidic chip has a small size. The thin film layer 3 has a thickness only of 10 μm to 500 μm, and the thin film layer 3 and the chip body 1 have a total thickness only of 1 mm to 5 mm.

A semiconductor cooler 7 is provided between the heat sink 5 and the microfluidic chip 11, a heat-conducting plate 71 is provided above the semiconductor cooler 7, and the thin film layer 3 abuts against the heat-conducting plate 71. For effective heat conduction, a design idea of an area of the heat-conducting plate 71 is the same as that of the heater, which is generally 5% to 100% larger than the heating area required by the microfluidic chip 11.

In order to avoid heat loss, a heat insulation layer 72 may be wrapped outside each of the heat-conducting plate 71 and the semiconductor cooler 7.

Figure 5:
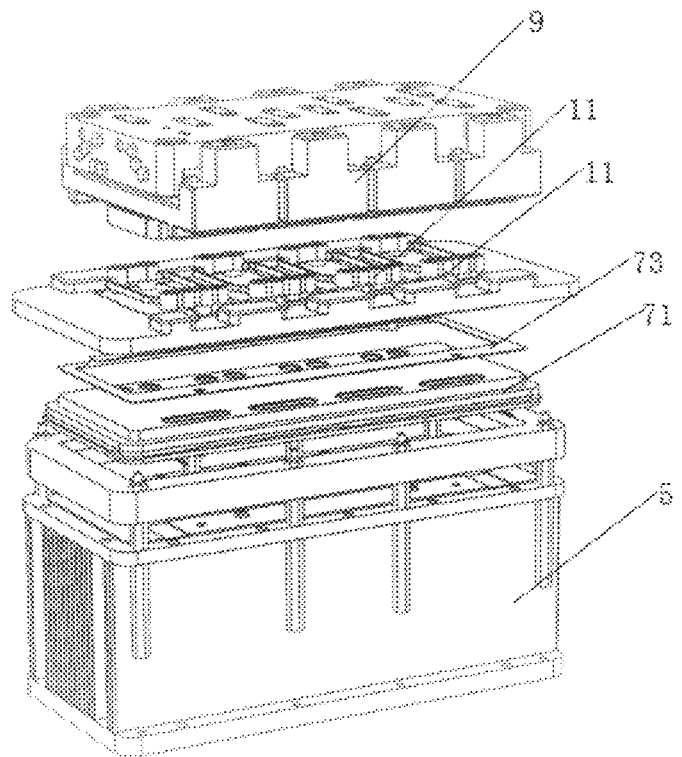
FIG. 5 is a schematic diagram illustrating a structure of the microfluidic chip assembly in a specific example according to the present invention.
Figure 6:
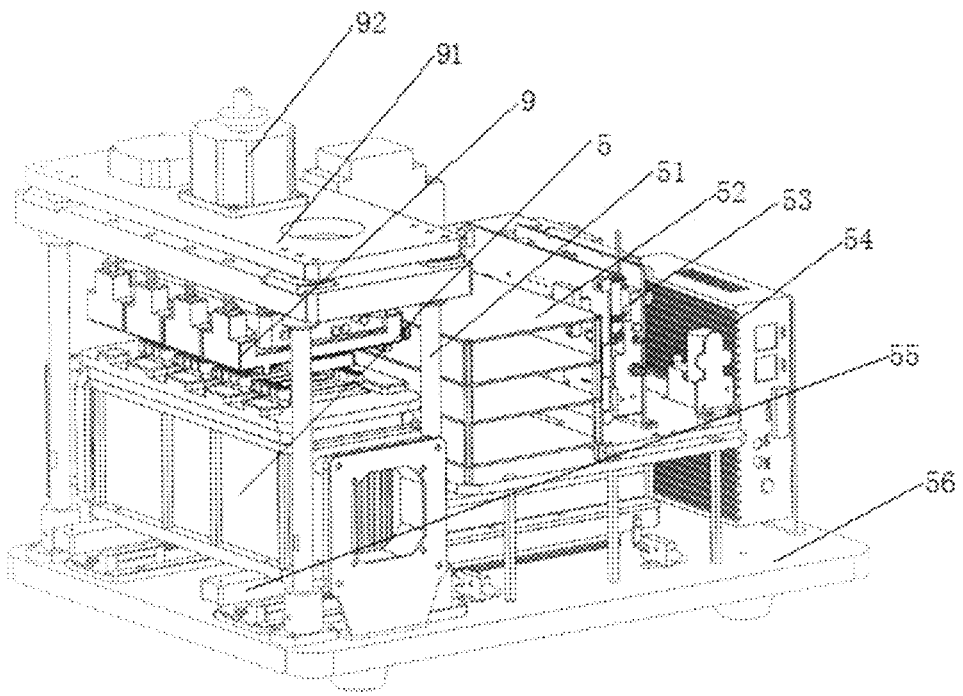
FIG. 6 shows a device provided with the microfluidic chip assembly according to the present invention.

The microfluidic chip assembly of the present invention is not only suitable for a single chip structure, but also can meet the requirements of high throughput. That is, when other structures are arranged in the same way, the number of microfluidic chips can be changed to adapt new detection conditions, for example, by arranging the microfluidic chips in parallel on the chip tray. In an example of the present invention, 4 microfluidic chips are arranged in parallel, as shown in FIG. 5. In order to further reduce the gap between materials and increase the thermal conductivity, the heat-conducting plate 71 is circumferentially provided with a flexible heat insulation pad 73. The pneumatic press plate and the heater can be an integrated structure.

The present invention also discloses a reaction method of an integrated device with a microfluidic chip assembly for rapidly performing digital PCR, including the following steps:

I. Actual loading of microfluidic chips
S1. The microfluidic chip assembly is driven by the driving motor to move out of the integrated device along the sliding rail 55 until the chip tray is exposed outside the integrated device, and then a microfluidic chip is loaded on the chip tray.
S2. An oil phase reagent and a water phase reagent are loaded respectively in an oil well and a sample well of a microfluidic chip 11 through a pipettor.
S3. The reagents in the microfluidic chip in S2 are sealed using the sealing cover 4.

II. Microdroplet generation and PCR
S4. The microfluidic chip assembly is driven by the driving motor to move into the integrated device until the microfluidic chip assembly is exactly below the pneumatic press plate 9.
S5. The pneumatic press plate 9 and the heater 8 are driven by the driving mechanism 92 to move in a direction of the microfluidic chip until the heater 8 is tightly attached to the upper surface of the microfluidic chip and the bottom of the microfluidic chip abuts against the heat-conducting plate 71.
S6. The temperature control system and the pneumatic control system are controlled by an IPC to respectively control an air pressure and a temperature of the microfluidic chip assembly to complete a thermal cycling process of PCR. The pneumatic control system applies a high-precision air pressure to the sample well and the oil well of the microfluidic chip, such that the water phase reagent and the oil phase reagent enter the microfluidic chip through microfluidic channels to form a stable and uniform microdroplet emulsion, and then the emulsion enters a PCR chamber through a microfluidic channel.

The temperature control system achieves the temperature control, and protects the droplets in combination with the pneumatic control system to make a PCR process completed.

III. Process completion
S7. The microfluidic chip assembly that completes a PCR process in S6 is driven by the driving motor to move out of the integrated device, and the microfluidic chip is taken out to complete the entire process.

Figure 7:
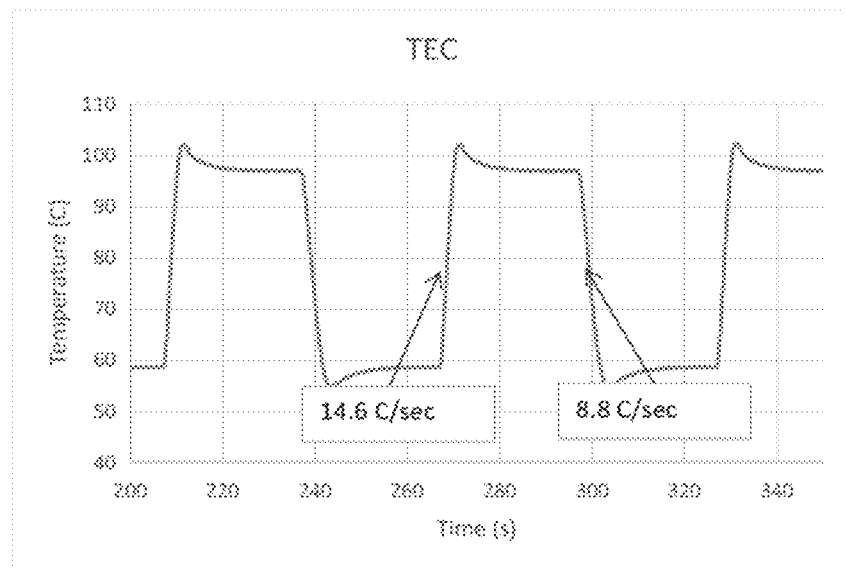
FIG. 7 shows a heating rate curve of the heat-conducting plate during a practical application according to the present invention.
Figure 8:
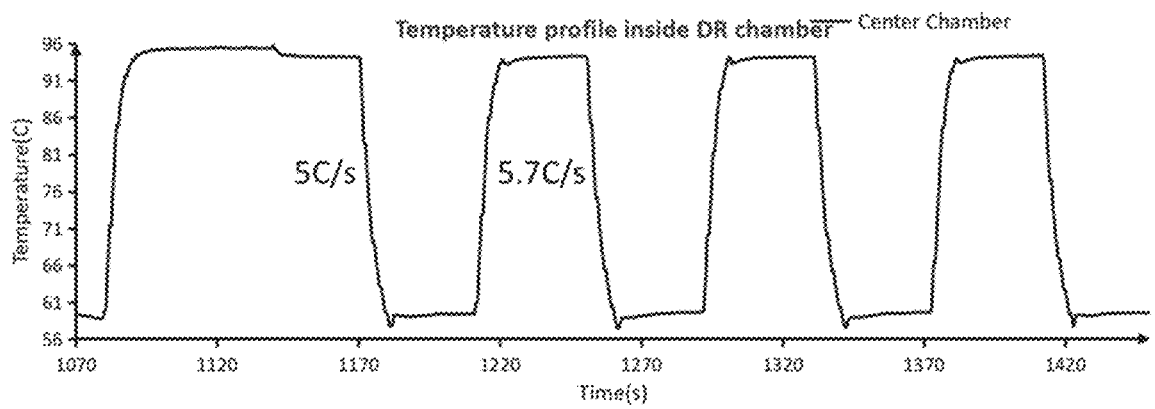
FIG. 8 shows a heating rate curve of a sample in the microfluidic chip during a practical application according to the present invention.

The heat-conducting plate in the structure of the present invention has a high heating rate. As shown in FIG. 7, in the temperature range of 58° C. to 98° C., an average heating rate can reach 14.6 C/s and an average cooling rate can reach 8.8 C/s within the interval of 20% to 80% of the temperature difference. As shown in FIG. 8, heating and cooling rates of a sample inside the microfluidic chip all exceed 5 C/s, which far exceed the heating and cooling rates in the prior art. Apparently, there are many specific implementations of the present invention, which are not listed here. All technical solutions formed from equivalent replacements or equivalent transformations should fall within the protection scope of the present invention.

What is claimed is:

1. A microfluidic chip assembly for rapidly performing digital polymerase chain reaction (PCR), comprising:
at least one microfluidic chip, wherein each of the at least one microfluidic chip comprises a sealing cover, a chip body, a thin film layer, an oil well, a sample well, and a waste liquid well; the chip body comprises multiple microfluidic channels and is defined with a top surface and a bottom surface; the sealing cover covers the top surface of the chip body to form an upper surface of each of the at least one microfluidic chip and comprises through holes that match the oil well, the sample well, and the waste liquid well and sealing filters fitted inside the through holes, respectively; the bottom surface of the chip body is sealed with the thin film layer, and the thin film layer has a thickness of 10 μm to 500 μm, and a total thickness of the at least one microfluidic chip is about 1 mm to 5 mm,
a heat sink arranged below the at least one microfluidic chip,
a semiconductor cooler arranged between the heat sink and the at least one microfluidic chip, a heat-conducting plate arranged above the semiconductor cooler, wherein the thin film layer of the at least one microfluidic chip abuts against the heat-conducting plate, a heater being positioned above the at least one microfluidic chip, wherein the heater is provided with a metal block to transmit heat to the at least one microfluidic chip with one side of the metal block attached to the upper surface of each of the at least one microfluidic chip, the heater is a heating resistor or a ceramic heater, and a pneumatic press plate being positioned above the heater, wherein the pneumatic press plate is attached to the other side of the metal block from the heater; and wherein both heating and cooling rates of a sample inside the at least one microfluidic chip exceed 5° C./s.

2. The microfluidic chip assembly according to claim 1, wherein
a heat insulation layer is wrapped outside each of the heat-conducting plate and the semiconductor cooler.

3. The microfluidic chip assembly according to claim 1, wherein
two or more microfluidic chips are arranged in parallel, and the two or more microfluidic chips are provided on a chip tray.

4. The microfluidic chip assembly according to claim 1, wherein
the heat-conducting plate is circumferentially provided with a flexible heat insulation pad.

5. The microfluidic chip assembly according to claim 3, wherein
the heat-conducting plate is circumferentially provided with a flexible heat insulation pad.

6. An integrated device with the microfluidic chip assembly according to claim 1, comprising a rack, wherein
a sliding rail is provided on the rack, and the microfluidic chip assembly is provided on the sliding rail;

a driving motor is provided on the rack, and the driving motor is configured to drive the microfluidic chip assembly to move on the sliding rail;

a driving mechanism is provided above the microfluidic chip assembly, and the driving mechanism is configured to drive the pneumatic press plate to move; and a temperature control system and a pneumatic control system are provided on a side of the microfluidic chip assembly and are electrically connected to the microfluidic chip assembly.

7. The integrated device according to claim 6, wherein
the rack is further provided with an industrial personal computer (IPC), wherein the IPC is electrically connected to the temperature control system and the pneumatic control system.

\* \* \* \* \*